US011468338B2

(12) United States Patent
Rossi et al.

(10) Patent No.: US 11,468,338 B2
(45) Date of Patent: Oct. 11, 2022

(54) COMPILING MODELS FOR DEDICATED HARDWARE

(71) Applicant: Apple Inc., Cupertino, CA (US)

(72) Inventors: Francesco Rossi, Sunnyvale, CA (US); Cecile M. Foret, Palo Alto, CA (US); Gaurav Kapoor, Santa Clara, CA (US); Kit-Man Wan, Sunnyvale, CA (US); Umesh S. Vaishampayan, Santa Clara, CA (US); Etienne Belanger, Saratoga, CA (US); Albert Antony, San Jose, CA (US); Alexey Marinichev, Mountain View, CA (US); Marco Zuliani, San Jose, CA (US); Xiaojin Shi, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 810 days.

(21) Appl. No.: 16/262,809

(22) Filed: Jan. 30, 2019

(65) Prior Publication Data
US 2020/0082274 A1    Mar. 12, 2020

Related U.S. Application Data

(60) Provisional application No. 62/729,968, filed on Sep. 11, 2018.

(51) Int. Cl.
*G06N 3/10* (2006.01)
*G06N 3/08* (2006.01)
(Continued)

(52) U.S. Cl.
CPC ............... *G06N 3/10* (2013.01); *G06F 8/41* (2013.01); *G06F 8/443* (2013.01); *G06F 8/4441* (2013.01);
(Continued)

(58) Field of Classification Search
CPC ............ G06N 3/10; G06N 3/04; G06N 3/063; G06N 3/08; G06F 8/41; G06F 8/443; G06F 8/4441; G06F 9/50
See application file for complete search history.

(56) References Cited

U.S. PATENT DOCUMENTS

2006/0112377 A1    5/2006 Nacul
2008/0114937 A1    5/2008 Reid
(Continued)

OTHER PUBLICATIONS

Jincy Joseph, Scheduling to Minimize Context Switches for Reduced Power Consumption and Delay in the Cloud, 2016, International Conference on Micro-Electronics and Telecommunication Engineering (Year: 2016).*
(Continued)

*Primary Examiner* — Wei Y Zhen
*Assistant Examiner* — Amir Soltanzadeh
(74) *Attorney, Agent, or Firm* — BakerHostetler

(57) ABSTRACT

The subject technology provides receiving a neural network (NN) model to be executed on a target platform, the NN model including multiple layers that include operations and some of the operations being executable on multiple processors of the target platform. The subject technology further sorts the operations from the multiple layers in a particular order based at least in part on grouping the operations that are executable by a particular processor of the multiple processors. The subject technology determines, based at least in part on a cost of transferring the operations between the multiple processors, an assignment of one of the multiple processors for each of the sorted operations of each of the layers in a manner that minimizes a total cost of executing the operations. Further, for each layer of the NN model, the subject technology includes an annotation to indicate the processor assigned for each of the operations.

20 Claims, 10 Drawing Sheets

(51) Int. Cl.
    *G06N 3/04*     (2006.01)
    *G06F 8/41*     (2018.01)
    *G06N 3/063*     (2006.01)
    *G06F 9/50*     (2006.01)

(52) U.S. Cl.
    CPC .............. *G06N 3/04* (2013.01); *G06N 3/063* (2013.01); *G06N 3/08* (2013.01); *G06F 9/50* (2013.01)

(56) References Cited

U.S. PATENT DOCUMENTS

| | | |
|---|---|---|
| 2013/0332711 A1 | 12/2013 | Leidel |
| 2014/0143194 A1 | 5/2014 | Yoon |
| 2018/0285727 A1 | 10/2018 | Baum |
| 2019/0095212 A1* | 3/2019 | Yang ...................... G06N 3/063 |
| 2019/0114535 A1* | 4/2019 | Ng ...................... G06N 3/0454 |
| 2019/0114548 A1* | 4/2019 | Wu ...................... G06F 9/3844 |
| 2019/0180170 A1 | 6/2019 | Huang |
| 2019/0180183 A1* | 6/2019 | Diamant .............. G06N 3/0454 |
| 2019/0205737 A1* | 7/2019 | Bleiweiss ............. G06N 20/00 |
| 2019/0340499 A1 | 11/2019 | Burger |

OTHER PUBLICATIONS

Stephen Dolan, Compiler Support for Lightweight Context Switching, Jan. 2013, ACM Transactions on Architecture and Code Optimization, vol. 9, No. 4, Article 36 (Year: 2013).*

Lyerly et al., "AIRA: A Framewrok for Flexible Compute Kemal Execution in Heterogeneous Platforms," IEEE Transactions on Parallel and Distributed Systems, Feb. 2018, vol. 29, No. 2, pp. 269-282.

Rotem et al., "Glow: Graph Lowering Compiler Techniques for Neural Networks," May 2, 2018, retrieved from arxiv.org/abs/1805.00907vl.

* cited by examiner

COMPILING MODELS FOR DEDICATED HARDWARE

CROSS-REFERENCE TO RELATED APPLICATIONS

The present application claims the benefit of U.S. Provisional Patent Application Ser. No. 62/729,968, entitled "COMPILING MODELS FOR DEDICATED HARDWARE," filed Sep. 11, 2018, which is hereby incorporated herein by reference in its entirety and made part of the present U.S. Utility Patent Application for all purposes.

TECHNICAL FIELD

The present description generally relates to compiling neural network model source code and task allocation for neural network models.

BACKGROUND

Software engineers and scientists have been using computer hardware for machine learning to make improvements across different industry applications including image classification, video analytics, speech recognition and natural language processing, etc. Notably, deep learning neural networks are being utilized more frequently to create systems that can perform different computing tasks from sizable amounts of data.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
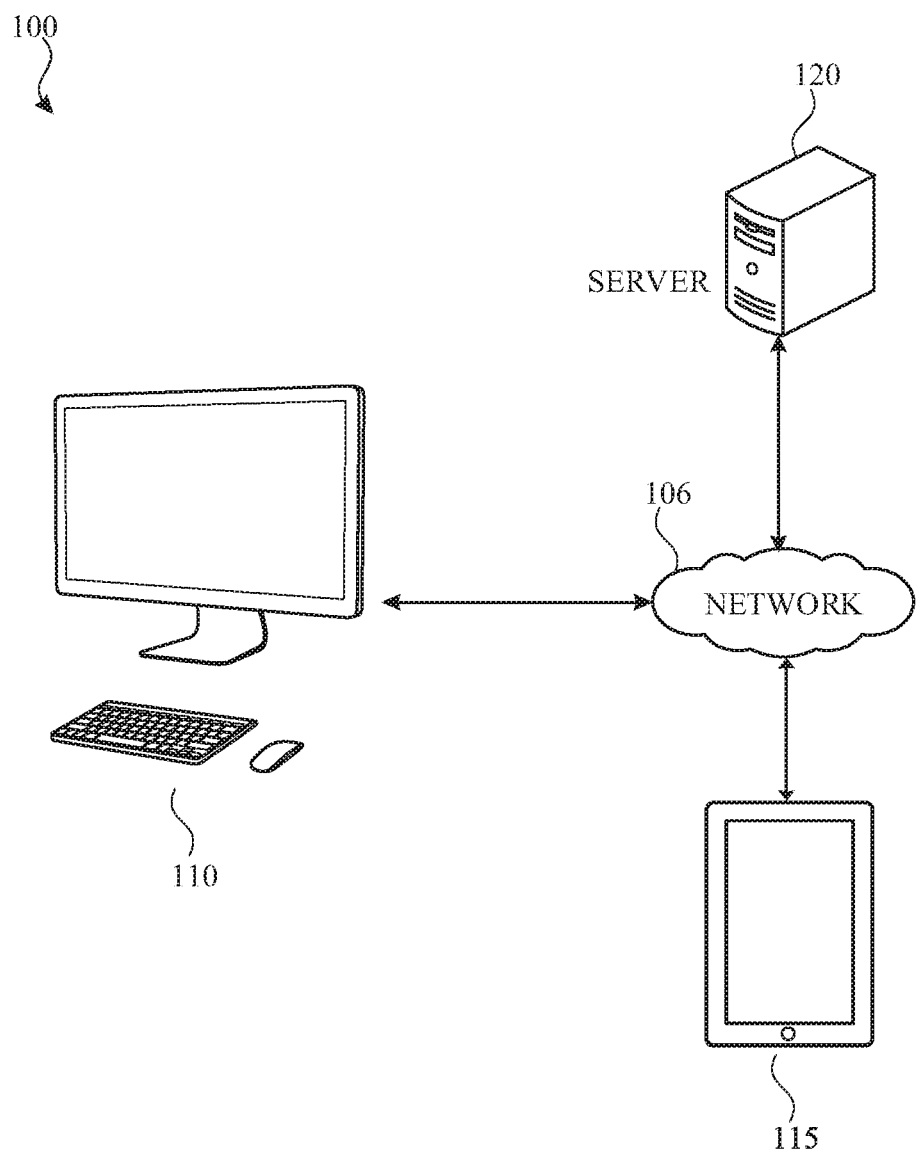
FIG. 1 illustrates an example network environment in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Machine learning has seen a meteoric rise in popularity in recent years due to the availability of massive amounts of training data, and advances in more powerful and efficient computing hardware. A common approach is utilizing a graphical processing unit (GPU) for training a deep neural network, and also for executing the deep neural network on new input data post-training. However, when deploying a given deep neural network for execution on a target platform, depending on the available hardware, it may be more efficient to run certain operations either on a GPU (if available) or in some instances run the operations instead on a CPU (if available) on a node by node basis. Moreover, as discussed further below, specialized, custom, and/or dedicated hardware, such as a neural processor, may be provided to perform certain operations in a more efficient manner or when such operations are not supported by the GPU and/or CPU.

Existing machine learning systems for executing a deep neural network model on a given platform lack capabilities for making the aforementioned kinds of determinations prior to execution. For example, a central processing unit (CPU) and memory can be utilized to instantiate and execute deep learning neural network models of various configurations. However, relying solely on the CPU for various operations of these machine learning systems or models can consume significant computing bandwidth of the CPU and/or increase overall power consumption. In some electronic devices, the additional consumption of computing resources or power (e.g., battery power) can introduce unwanted effects including increasing the temperature of the device itself which may detrimentally device performance among other types of negative consequences to the functionality of the device.

As discussed herein, a neural network (NN) is a computing model that uses a collection of connected nodes to process input data based on machine learning techniques. Neural networks are called networks because they may be represented by connecting together different operations. A model of a NN (e.g., feedforward neural network) may be represented as a graph representing how the operations are connected together from an input layer, through one or more hidden layers, and finally to an output layer, with each layer including one or more nodes, and where different layers perform different types of operations on respective input. It is appreciated, however, that other types of neural networks are contemplated by the implementations described herein. For example, a recurrent neural network such as a long short-term memory (LSTM) neural network may be provided for annotation, or a convolutional neural network (CNN) may be provided for annotation. Further, a NN as mentioned herein can also refer to a deep neural network corresponding to a neural network with multiple hidden layers.

Recently, specialized (e.g., dedicated) hardware has been developed that is optimized for performing particular operations from a given NN. In particular, as discussed further in FIG. 2, a given electronic device may include a neural processor, which can be implemented as circuitry that performs various machine learning operations based on computations including multiplication, adding and accumulation. Such computations may be arranged to perform, for example, convolution of input data. A neural processor, in an example, is specifically configured to perform machine learning algorithms, typically by operating on predictive models such as NNs. In one or more implementations, an electronic device may include a neural processor in addition to a CPU and/or a GPU. In an example, the neural processor may have the highest efficiency, with respect to energy consumption (e.g., battery power), for performing a particular operation related to a given NN, in general among a CPU and/or a GPU included in an electronic device.

A CPU, as discussed herein, can refer to a main processor in a given electronic device that performs operations for basic arithmetic, logical, control and input/output operations specified by the instructions of a computer program or application, including some operations for neural network models. A GPU, as discussed herein, can refer to a specialized electronic circuit designed to perform operations for rendering graphics, which is also being utilized in many instances to process computational workloads for machine learning operations (e.g., as specified by instructions of a computer program or application). The CPU, GPU, and neural processor may each have different computational specifications and capabilities depending on their respective implementations where each of the aforementioned components can provide varying degrees of performance for certain operations in comparison with the other components.

Implementations of the subject technology minimize a total runtime associated with a neural network model across any number of different device types by: 1) reordering operations to minimize tensor lifetime and improve cache usage and 2) for each layer of the neural network model, applying annotations at each node of the layer to enable an allocation (e.g., at runtime) of performing the node's operations on either a CPU, a GPU, or another processor (e.g., a neural processor). These benefits therefore are understood as improving the computing functionality of a given electronic device, such as an end user device which may generally have less computational resources available than, e.g., one or more cloud-based servers. In such an end user device as described further herein, machine learning models may be compiled from source code and executed locally by the end device, rather than relying on a cloud-based implementation where data has to be sent over a network connection to an outside device, which can also introduce privacy risks along with increasing latency for receiving results from remotely executing (e.g., on a server) such machine learning models. The annotations provide an indication, e.g. to an operations dispatcher or scheduler of a device, as to whether a GPU, a CPU, or a neural processor may be best suited to perform the node's operations based on, for example, the types of operations being performed. Thus, a device executing the neural network model may use the annotations to determine whether to utilize the GPU, CPU, or neural processor for each node of each layer (e.g., based at least on the device's hardware capabilities and/or current resource utilization). Annotating the nodes of the neural network model in this manner enables an annotated neural network model to be compiled once and used efficiently across any number of different types of devices, including future devices with different hardware capabilities.

FIG. 1 illustrates an example network environment 100 for in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, an electronic device 115, and a server 120. The network 106 may communicatively (directly or indirectly) couple the electronic device 110 and/or the server 120, the electronic device 115 and/or the server 120, and/or electronic device 110 and/or the electronic device 115. In one or more implementations, the network 106 may be an interconnected network of devices that may include, or may be communicatively coupled to, the Internet. For explanatory purposes, the network environment 100 is illustrated in FIG. 1 as including an electronic device 110, an electronic device 115, and a server 120; however, the network environment 100 may include any number of electronic devices and any number of servers.

The electronic device 110 may be, for example, desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 110 is depicted as a desktop computer. The electronic device 110 may be, and/or may include all or part of, the electronic system discussed below with respect to FIG. 10.

In one or more implementations, the electronic device 110 may provide a system for dynamically allocating tasks performed by neural network models as described herein. In particular, the subject system may include a neural network annotator component, which works in conjunction with a neural network compiler, such that, during compiling a neural network model, the nodes of the neural network model are annotated to indicate a particular processor (e.g., CPU, GPU, neural processor) for completing an operation associated with a given node in the least amount of total runtime. In an example, the subject system, using the compiled code, can create a software package for deployment on a target device, such as the electronic device 115, with facilitation from the server 120. When executing the compiled neural network model, the target device can utilize the annotations as an indication to perform a given operation on either a CPU, GPU, neural processor (e.g., to complete the operation in the least amount of total runtime).

The electronic device 115 may include a touchscreen and may be, for example, a portable computing device such as a laptop computer that includes a touchscreen, a smartphone that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device. The electronic device may further include processors having different compute capabilities, including, for example, a CPU, a GPU, and/or a neural processor for performing neural network operations. In FIG. 1, by way of example, the electronic device 115 is depicted as a tablet device with a touchscreen. In one or more implementations, the electronic device 115 may be, and/or may include all or part of, the electronic device discussed below with respect to the electronic system discussed below with respect to FIG. 10.

In one or more implementations, the server 120 deploys the compiled code included in a software package to a target device for execution. The electronic device 115, in an example, may be a target device for receiving the software package with the compiled neural network code and for executing the compiled code in a runtime environment of the electronic device 115. The electronic device 115 (or any electronic device that is a target device) includes a framework that is enabled to access annotations included in the compiled code of the neural network and subsequently make decisions for scheduling and/or dispatching each operation (e.g., either running it on a CPU, GPU, specialized processor such as a neural processor, etc.) based on the accessed annotations. A framework can refer to a software environment that provides particular functionality as part of a larger software platform to facilitate development of software applications.

Figure 2:
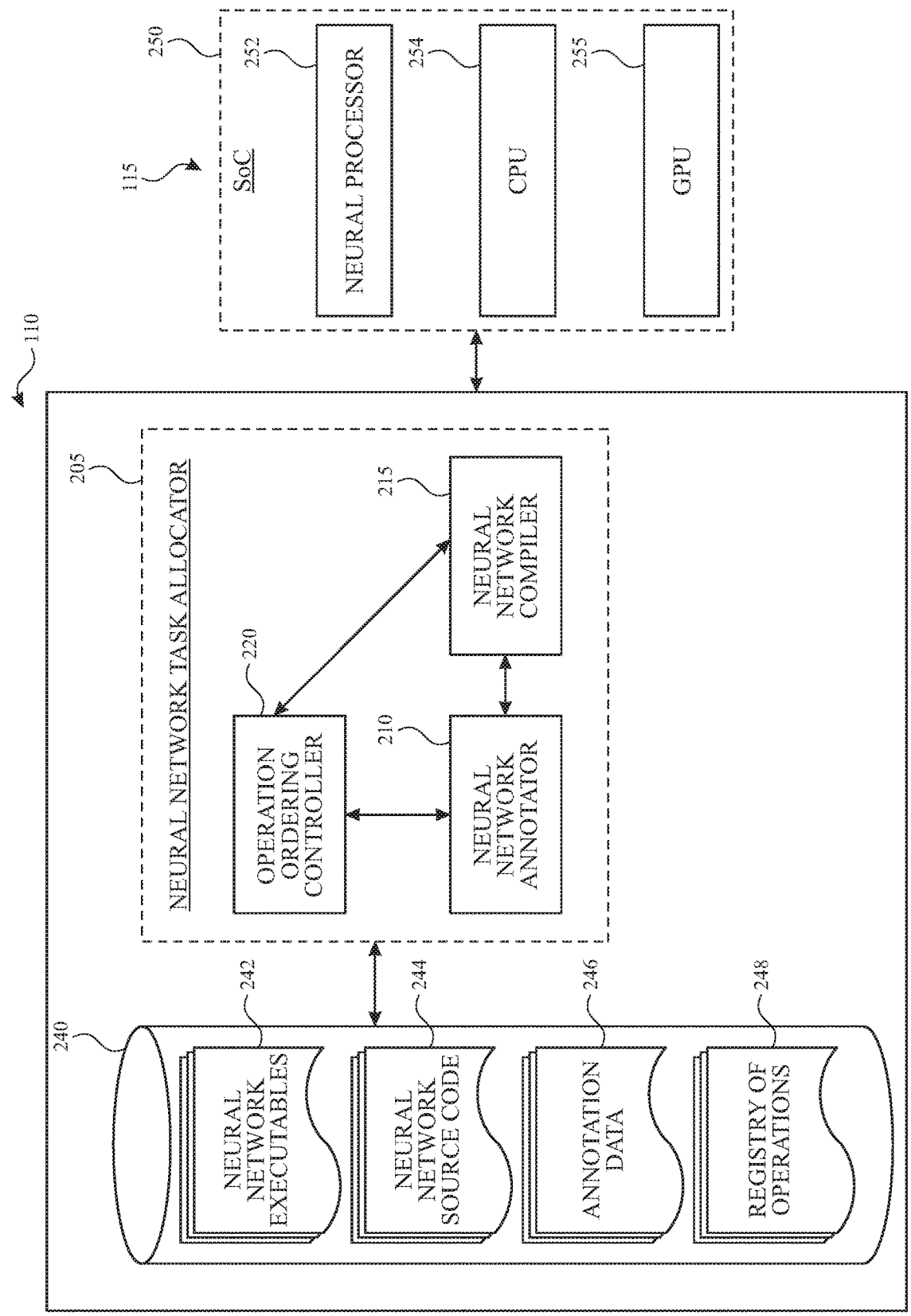
FIG. 2 illustrates an example software architecture for optimizing neural networks for execution on various processors in accordance with one or more implementations.

FIG. 2 illustrates an example software architecture for optimizing neural networks for execution on various processors, e.g., having different compute capabilities, in accordance with one or more implementations. For explanatory purposes, the software architecture is described as being provided by the electronic device 110 of FIG. 1, such as by a processor and/or memory of the electronic device 110; however, the software architecture may be implemented by any other electronic device. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, the software architecture includes a neural network task allocator 205 that includes a neural network annotator 210, a neural network compiler 215, and an operation ordering controller 220. A memory 240 includes neural network source code, which after being compiled by the neural network compiler 215, generates neural network executables 242 that can be deployed to different target platforms for execution (e.g., as provided by the electronic device 115). Although the neural network annotator 210 and the operation ordering controller 220 are shown as being separate from the neural network compiler 215 for purposes of explanation, in at least one implementation, the neural network annotator 210 and/or the operation ordering controller 220 may be part of the neural network compiler 215 such that the neural network compiler 215 determines an ordering of operations in the neural network source code 244 and/or performs annotations of the neural network source code 244 during compiling in the same manner as the operation ordering controller 220 and/or the neural network annotator 210 as described below.

During compile time, the operation ordering controller 220 sorts (e.g., orders) operations from each layer of the neutral network to minimize tensor (e.g., a multidimensional numerical array) lifetime and/or to improve cache usage. In another example, the operation ordering controller 220 can sort by processor constraints with operations executed by the neural processor being included earlier in the order, if possible, and other operations that are not supported by the neural processor being ordered last, if possible, to minimize cost to transfer to a different processor (e.g., CPU or GPU).

During compile time, the neural network annotator 210, for each node at a layer of a neural network model, can determine an operation performed at the node and, based on the determined operation, annotate that node to perform on either a CPU or GPU or some other processor or hardware (e.g., a neural processor) of a given electronic device that is a target platform for executing the neural network model. In an example, the neural network annotator 210 can initially determine whether a given operation is supported by the CPU, the GPU, or the neural processor and annotate a particular node accordingly.

The neural network annotator 210 can also consider a total runtime of completing an operation (e.g., for a case in which the operation can be run on the CPU, the GPU, or the neural processor) for determining the annotation for a particular node. To determine the total runtime of an operation, the neural network annotator 210 determines a sum based on a cost of transferring the operation to another processor (if any) and a cost for completing the operation on the particular processor. In particular, a cost of transferring the operation (e.g., in terms of latency or time) from a first processor (e.g., neural processor) to instead run on a second processor (e.g., CPU or GPU) or vice-versa is determined. A cost of the operation on the first processor and/or the second processor is also determined based on a number of cycles for completing the operation, where a more costly operation would take more cycles to complete in comparison to a less costly operation. The neural network annotator 210 then determines the total runtime by adding the cost of transferring the operation and the number of cycles for completing the operation.

In an example, the neural network annotator 210 can compare respective total runtime values for completing the operation on the CPU, GPU, or neural processor and then annotate the node based on whichever has the lower total runtime value. In another example, if the cost to transfer the operation from a first processor to a second processor, in addition with running the operation on the second processor, results in the total runtime being greater than keeping the operation on the first processor, then neural network annotator 210 does not annotate the node to complete the operation on the second processor. In one or more implementations, the neural network annotator 210 determines the annotation without factoring in the cost to transfer the operation to another processor.

Further, the neural network annotator 210 can determine whether a given operation is optimized for the CPU, GPU, or neural processor. In this example, the neural network annotator 210 would look at the architecture of the target device to determine whether the device would run the operation better on either the CPU or GPU. The neural network annotator 210 can also determine an estimated computing cost of executing the operation on the CPU, the GPU and/or the neural processor. For example, in instances in which the operation is supported by multiple of the available processors (e.g., the CPU the GPU, and/or the neural processor), the neural network annotator 210 can determine which processor completes the operation in a faster amount of time (e.g., by looking at the architecture of the device to determine whether the device would run the operation better on either the CPU, GPU, or the neural processor).

The memory 240 further includes a registry of operations 248 that includes information of each supported operation that can run on a given platform and/or every processor (e.g., CPU, GPU, or specialized or custom processor e.g., AI optimized processor). In an example, annotation of each node in a neural network model is assigned in part by using the registry of operations 248 and determining whether a given operation is supported by a particular CPU, GPU, or neural processor for the given platform. For example, the neural network annotator 210 accesses the registry of operations 248 and determines if an operation of a node is supported by the CPU, GPU and/or neural processor based on information provided in the registry of operations 248. The neural network annotator 210 can annotate that node accordingly to indicate the supported hardware (e.g., CPU, GPU, neural processor) to execute the operation.

In one or more implementations, the registry of operations 248 may be implemented as one or more lookup tables including: 1) lookup table(s) for required type and parameters for each supported operation per device; and 2) lookup table(s) for performance measurements of an operation per device or hardware processor. In an example, a lookup table is data structure that enables quick access to values that replace runtime computation that might be needed to determine such values (e.g., performance measurements and required type and parameters mentioned above). In an implementation, the lookup table can be generated by 1) theoretical estimates and simulations, 2) actual configuration measurements, and/or 3) statistical models built on measurements. The neural network annotator 210 in an example can utilize a lookup table to determine whether the CPU, GPU, or neural processor would have better performance in running a particular operation. In addition to performance measurements, the neural network annotator 210 can further check a type and/or parameter(s) that are required for a given operation. If there is a type mismatch or missing parameters that would disallow a particular operation to complete on a CPU, GPU, or neural processor, the neural network annotator 210 can annotate a particular node accordingly to use the other processor.

The neural network compiler 215 takes neural network source code 244 and compiles it into a neural network executable 242. As mentioned above, during the compiling process, the neural network annotator 210 assigns an annotation of each node to indicate whether the operation is best performed on a CPU, GPU, or neural processor based at least in part on hardware capabilities of a target device and the considerations discussed elsewhere herein. In an example, the neural network source code 244 can represent in code form a set of operations that are to be performed by corresponding nodes from different layers of a given neural network model. The neural network annotator 210 therefore may annotate, within the neural network source code 244, an indication to perform a particular operation of a node corresponding to a layer on particular hardware, such as a CPU, a GPU, or neural processor based on a graph corresponding to a shortest path (as discussed further herein). In turn, the neural network compiler 215 compiles the neural network source code 244 with the annotations corresponding to the shortest path through such a graph. Consequently, the annotations are included as part of the compiled neural network model code in one implementation. In at least one implementation, the neural network annotator 210 may also store associated annotation data 246 separately in the memory 240.

Although the neural network compiler 215 is provided on the electronic device 110 in the example of FIG. 2, in some implementations, such a compiler may be provided on a particular electronic device that compiles neural network source code and executes the compiled neural network model on the same device. An example software architecture for a device with a neural network compiler and that locally executes a compiled neural network model is described in further detail in FIG. 6 below.

In an implementation, a neural network model can be compiled for a specific target platform and then deployed to a different device such as the electronic device 115 for execution. As further illustrated, the electronic device 115, in an implementation, includes a system-on-chip (SOC) 250. The SOC 250 includes a neural processor 252, a CPU 254, and a GPU 255, which may be utilized to execute operations from a compiled neural network model including the annotations.

Figure 3:
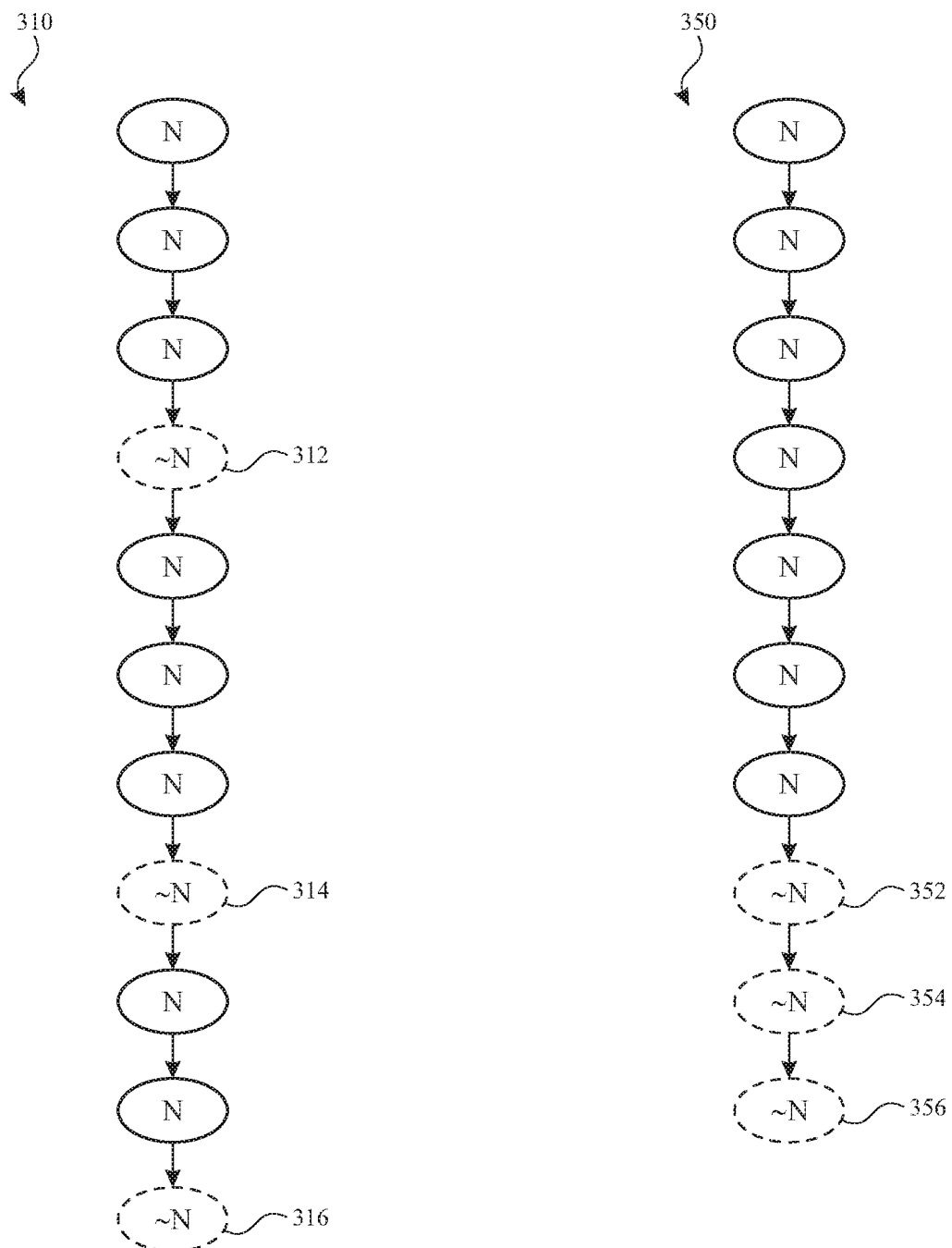
FIG. 3 conceptually illustrates an example ordering of operations in a neural network model in accordance with one or more implementations.

FIG. 3 conceptually illustrates an example ordering of operations in a neural network model in accordance with one or more implementations. FIG. 3 will be discussed by reference to FIG. 2, particularly with respective components of the neural network task allocator 205.

As discussed above, a neural processor is more power efficient than a GPU and/or a CPU for some deep learning workloads. However, not all operations are available (e.g., not supported or heavily inefficient) for a given neural network model to be performed by the neural processor provided in an electronic device. The subject technology, in an implementation, uses the neural processor to perform an operation, whenever possible, to help achieve higher energy efficiency (e.g., conserving battery power on the electronic device). Further, as described herein, the subject technology can also mitigate transfer overheads if other processors are utilized.

The subject technology, for example, generates a graph representing a data flow through a given neural network model from node to node. More specifically, a model of the neural network may be represented as a graph with multiple nodes representing how the operations are connected together from an input layer, through one or more hidden layers, and finally to an output layer. Each node in such a graph represents an operation to be performed on a particular processor in an example. In the graph, the output of operation in a first node is received as an input to a second node when the first node and the second node are connected in the graph.

In an implementation, a graph 310 illustrates an ordering performed by the operation ordering controller 220 for operations in a given neural network model to minimize tensor lifetime and/or improve cache usage. As shown, the graph 310 includes an ordering of nodes that sorts respective operations such that operations are performed on the neural processor before output data is transferred to a respective node corresponding to an operation performed at a non-neural processor (e.g., CPU or GPU). For example, operation 312 is performed after an initial three operations are performed on the neural processor (e.g., as illustrated by the 'N' nodes). Similarly, operation 314 is performed after a second set of three operations (e.g., the three subsequent nodes after operation 312) are performed. Further, operation 316 is performed after a third set of two operations (e.g., the two nodes after the node of operation 314) are performed.

In an implementation, to mitigate the costs of transfers to a different processor for one or more operations, a graph 350 illustrates a different ordering performed by the operation ordering controller 220 for operations in a given neural network model. As shown, the graph 350 includes operations that are sorted first by processor constraints in conjunction with a topological constraint, such that operations that meet such constraints are sorted to be performed by the neural processor before operations 352, 354, and 356 that are transferred to a different processor (e.g., CPU or GPU corresponding to the illustrated "-N" node label) to be performed.

Figure 4:
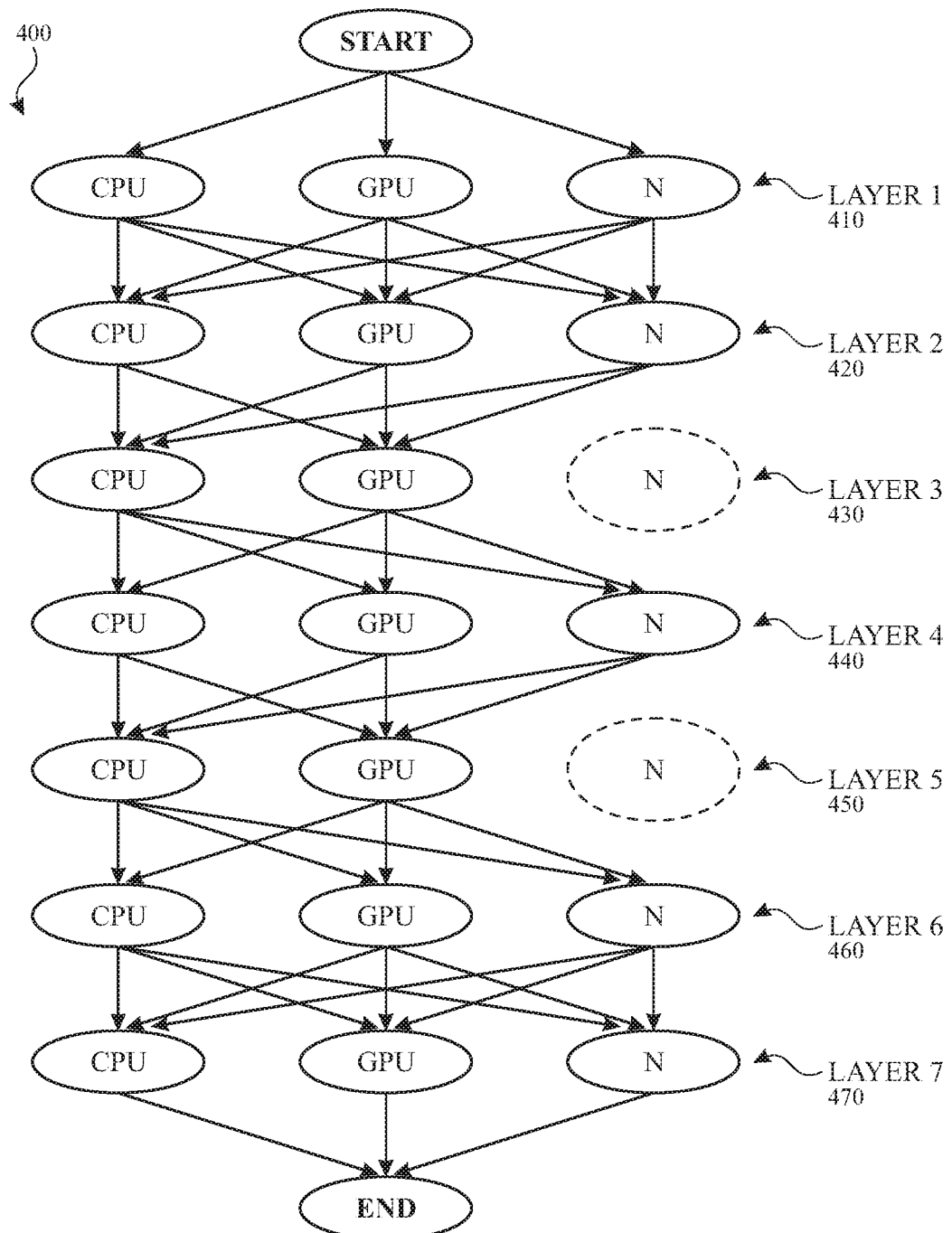
FIG. 4 conceptually illustrates an example graph representing possible placement of operations in a neural network model on various processors in accordance with one or more implementations.

FIG. 4 conceptually illustrates an example graph 400 representing possible placement of operations in a neural network model on various processors in accordance with one or more implementations. FIG. 4 will be discussed by reference to FIG. 2, particularly with respect components of the neural network task allocator 205. A neural network model can be represented as a directed acyclic graph (DAG) where the DAG includes directed edges between two respective nodes. Further, the DAG includes no loops such that there is no path starting at any node that follows a sequence of directed edges and eventually loops back to the same node.

In the example of FIG. 4, the neural network annotator 210 generates the graph 400 based on operations sorted by execution order from each layer of the neural network model. Each node (e.g., vertex) in the graph 400 corresponds to a respective operation to be performed on a particular processor (e.g., CPU, GPU, or neural processor indicated by "N") corresponding to a respective layer of the neural network model. As described before in FIG. 2, a registry of operations can be utilized to determine whether a particular operation is supported by the CPU, GPU and/or the neural processor for the given platform. Using the registry of operations for each layer of the neural network model, the neural network annotator 210 generates respective nodes corresponding to various processors in a given electronic device (e.g., the electronic device 115) when an operation at a particular layer is supported by a particular processor. For example, if an operation at a given layer is supported by all three processors (e.g., CPU, GPU, and neural processor), the neural network annotator 210 generates three respective nodes for the layer in the graph 400.

Each edge in the graph 400 corresponds to a directed edge that can indicate a transfer between different processors (e.g., CPU to GPU or neural processor, GPU to CPU or neural processor, neural processor to CPU or GPU) where each edge is associated with a respective transfer cost for such a transfer between different processors. As also shown in the graph 400, a directed edge can be between the same type of processor (e.g., CPU to CPU, GPU to GPU, neural processor to neural processor, etc.). A directed edge from nodes representing the same processor therefore may not incur a transfer cost (e.g., CPU to CPU, GPU to GPU, neural processor to neural processor). In this manner, transfer and compute costs can be estimated or measured at each node in an implementation. Further, in this example, memory copies are not performed and therefore are not included in a cost determination for determining a shortest path through the graph 400.

The graph 400 includes layers 410, 420, 430, 440, 450, 460, and 470. The layer 410 can correspond to an input layer of the neural network model, and the layer 470 can correspond to an output layer of the neural network model. The layers 420, 430, 440, 450, and 460 correspond to intermediary hidden lawyers in the neural network model. In this example, layer 430 ("Layer 3") and layer 450 ("Layer 5") do not include an operation to be performed by the neural processor (e.g., unsupported operation) as indicated by the absence of a particular directed edge to a node corresponding to the neural processor and the absence of the node itself. As such, in an example, the neural network annotator 210 generates the graph 400 without including such nodes corresponding to the neural processor at layer 430 and layer 450, which indicate unsupported operations for that particular processor in the corresponding layer.

To determine the lowest cost for executing the neural network model, in an implementation, the neural network task allocator 205 can determine a shortest path through the graph 400 by applying a shortest path algorithm to the graph 400. A shortest path, in the context of the graph 400, corresponds to a particular path through various nodes of the graph 400 taking into account compute costs for operations and transfer costs (if any) for such operations. The shortest path algorithm, in an example, therefore determines a sum of the costs of performing operations at respective nodes in the graph 400 and any transfers costs, and selects a particular path with the lowest associated aggregate cost. Because the graph 400 is a directed acyclic graph, a number of different techniques can be implemented to determine a shortest path including, without limitation, a Bellman-Ford algorithm, Dijkstra's algorithm, topological sorting, etc.

In an example, operation placement on a particular processor for each layer of a neural network model can be determined based on determining a shortest path through a directed acyclic graph (DAG) where the DAG includes directed edges between two respective nodes. Further, the DAG includes no loops such that there is no path starting at any node that follows a sequence of directed edges and eventually loops back to the same node. The following discussion relates to a shortest path in the graph 400 as determined by the neural network task allocator 205.

Figure 5:
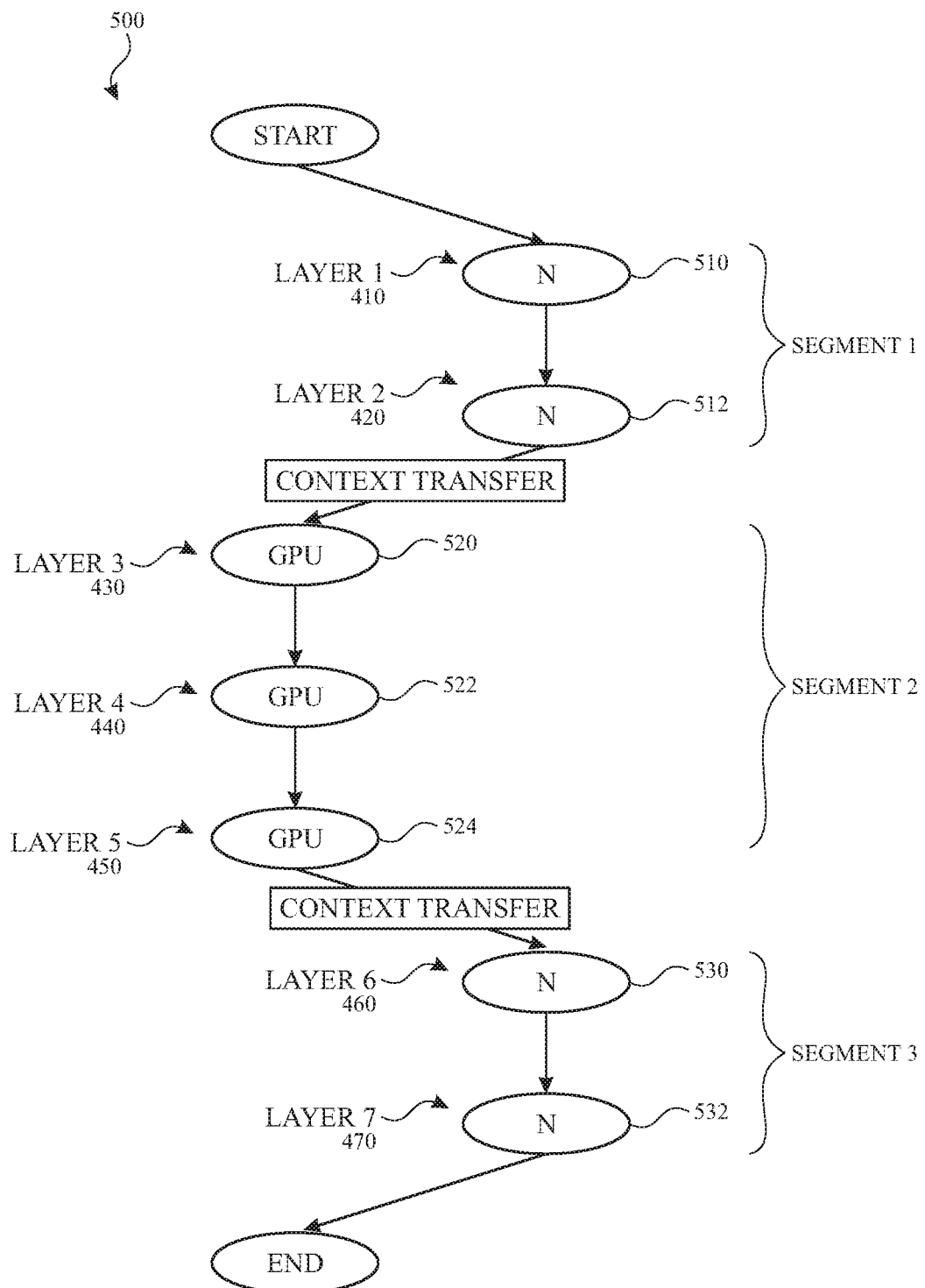
FIG. 5 conceptually illustrates an example graph representing a shortest path from the graph illustrated in FIG. 4 in accordance with one or more implementations.

FIG. 5 conceptually illustrates an example graph 500 representing a shortest path from the graph 400 illustrated in FIG. 4 in accordance with one or more implementations. The shortest path corresponds to a path that includes a lowest cost for performing the operations from the neural network model from FIG. 4.

In an implementation, information related to the shortest path can be stored as part of the compiled neural network model and then accessed by the electronic device that is executing the operations from each layer of the compiled model. Alternatively or conjunctively, information related to the shortest path can be stored as part of the annotation data (e.g., the annotation data 246).

As illustrated, the shortest path starts at a layer 410 ("Layer 1") including an operation, corresponding to a node 510, that is performed by the neural processor. In an example, the layer 410 corresponds to an input layer of the neural network model. As mentioned before, the subject technology may prefer executing an operation on the neural processor, if available. Nodes 510 and 512 correspond to a first segment ("Segment 1") of the path for operations performed on the neural processor. In the example of FIG. 5, each segment in the path includes a set of operations that are performed in a sequential manner at a particular processor. After the operation is performed at the node 510, the output is provided as the input to node 512 at a layer 420 ("Layer 2"), and an operation for node 512 is then performed by the neural processor.

After the operation at node 512 is completed by the neural processor, the shortest path includes a context transfer where the output of the operation is transferred to a different processor (e.g., the GPU as indicated in node 520). A second segment in the shortest path includes nodes 520, 522, and 524 and corresponds to various operations performed by the GPU. An operation at the node 520 is executed by the GPU and the output is provided to node 522 at a layer 440 ("Layer 4"). An operation at the node 522 is executed by the GPU and the output is provided to node 524 at a layer 450 ("Layer 5").

A second context transfer occurs after the operation at node 524 that provides the output of the node 524 over to node 530 at a layer 460 ("Layer 6") for processing by the neural processor. A third segment in the shortest path includes nodes 530 and 532 corresponding to various operations performed by the neural processor. An operation at the node 530 is executed by the neural processor and the output is provided to node 532 at a layer 470 ("Layer 7"). An operation at the node 532 is executed by the neural processor. In this example, the layer 470 corresponds to the output layer of the neural network model, and the output of the neural network model corresponds to the output of the operation performed by the neural processor at the node 532.

Figure 6:
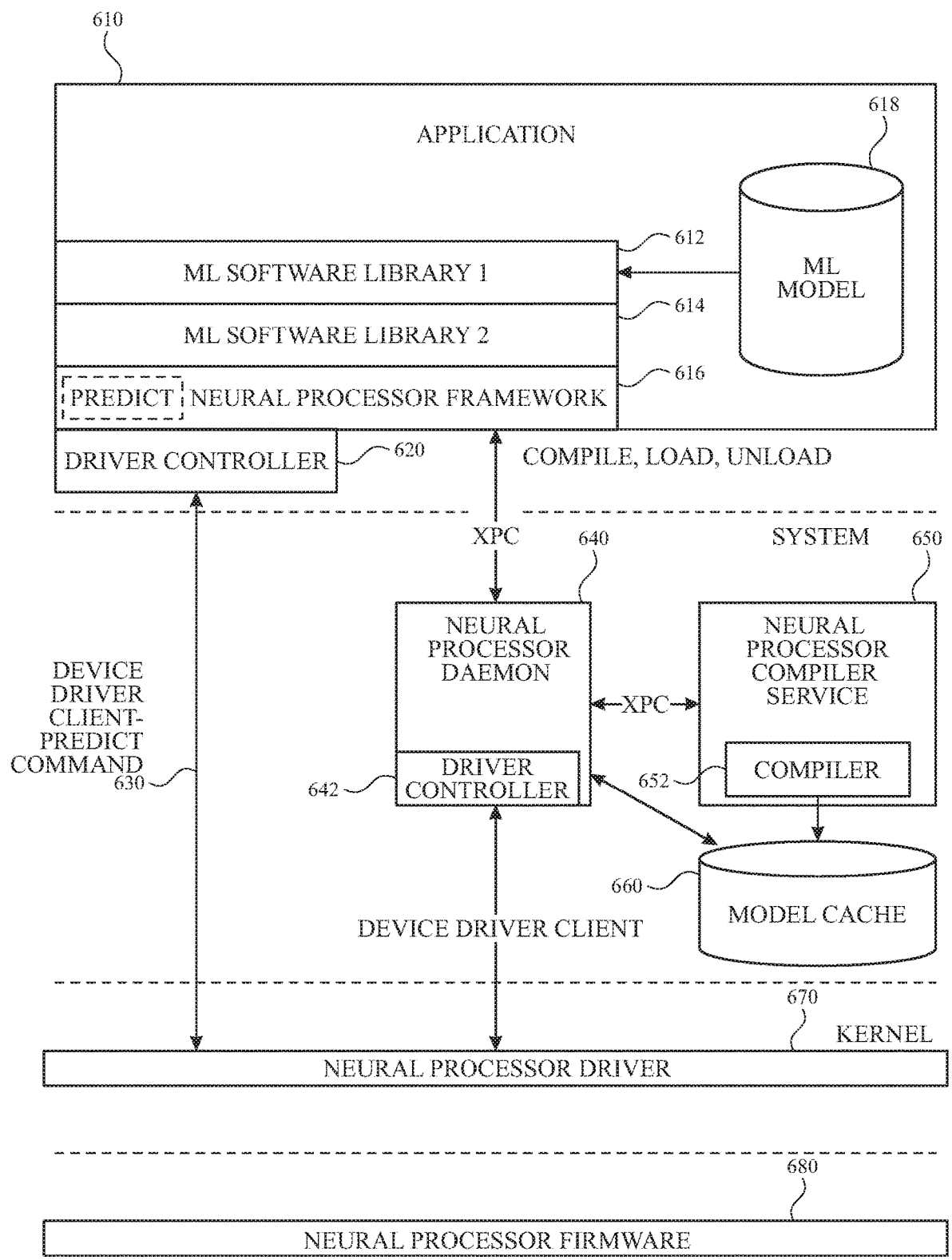
FIG. 6 illustrates an example software stack implemented on an electronic device for locally compiling source code for a neural network model and loading the model in an application that executes on the electronic device in accordance with one or more implementations.

FIG. 6 illustrates an example software stack implemented on an electronic device (e.g., the electronic device 115) for locally compiling source code for a neural network model and loading the model in an application that executes on the electronic device in accordance with one or more implementations. The software stack may include different layers corresponding to different address spaces in memory of the electronic device. In some implementations, the electronic device may include a neural network compiler on the device itself which enables the device to support compilation of source code for neural network models. In this manner, the device may load and execute the locally compiled neural network model without involving another device (e.g., the server 120 or the electronic device 110) to compile such source code. Although the electronic device 115 is mentioned, it is appreciated that the software stack illustrated in FIG. 6 may be implemented by any appropriate device that includes a neural processor to support execution of neural network models outside of a CPU and/or GPU.

As illustrated, the software stack includes an application 610 in a first layer of the software stack. The application 610 may include components such as a first machine learning software library 612, a second machine learning software library 614, and a neural processor framework 616. In an implementation, the first machine learning software library 612 may be exposed for use by third parties (e.g., a developer writing code for the application 610) while the second machine learning software library 614 is not accessible by third parties and is utilized by internally by some components illustrated in the software stack. Below the first layer is a middle layer ("System") including a neural processor daemon 640, a neural processor compiler service 650, and a model cache 660. In an example, the neural processor daemon 640 is a background process which the neural processor framework 616 can communicate with to perform operations for compiling, loading and/or unloading a neural network model. As further shown, a neural processor driver 670 is in a layer corresponding to a kernel (e.g., the OS running on the electronic device 115) and below the neural processor driver 670 is a neural processor firmware 680. The neural processor driver 670, in an example, allows other software (e.g., the application 610 and/or the neural processor daemon 640) to communicate with neural processor firmware 680 which enables such software to control (e.g., via execution of commands) the neural processor (e.g., the neural processor 252) included in the electronic device.

The neural processor framework 616 may facilitate communication with the neural processor daemon 640 to invoke commands related to managing neural network models including at least compiling, loading and/or unloading neural network models. In an example, the neural processor daemon 640 may receive a notification that the application 610 has been installed on the electronic device. The neural processor daemon 640 can iterate through components of the application 610 (e.g., as included in the application bundle or package) to locate a neural network model as part of the application. Once located, the neural processor daemon 640 sends a command to the neural processor compiler service 650 to compile source code associated with the neural network model. As illustrated, the neural processor compiler service 650 includes a compiler 652 that compiles source code corresponding to the neural network model. The compiler 652 may store the compiled neural network model in a model cache 660 which may be stored in memory (e.g., RAM provided by the electronic device 115). In an implementation, the model cache 660 is stored in a memory address space (e.g., a system memory address space) separate from a memory address space of the application 610. The neural processor daemon 640 further includes a driver controller 642 to communicate directly (e.g., via a device driver client) with the neural processor driver 670, which is discussed in more detail below.

In an implementation, when the application 610 is executed (e.g., after being installed), the application 610 may load the cached neural network model now stored in the model cache 660 and store the neural network model into a ML model storage 618 in the memory address space of the application 610. The application may utilize at least one of the ML software library 612 and the ML software library 614 and/or the neural processor framework 616 to send a command to the neural processor daemon 640 for loading the cached neural network model into the memory address space of the application 610 (e.g., by storing in the ML model storage 618). After being loaded into the memory address space, the application 610 can invoke commands using the loaded neural network model in various ways as discussed in the following description.

In an example, the application 610 includes a driver controller 620 that communicates with the neural processor driver 670. During execution, the application 610 may execute a prediction command for the already loaded compiled neural network model in the memory space of the application 610. The neural processor driver 670 enables the application 610 to send command directly to the neural processor firmware 680 for execution on the neural processor. For example, the application 610 utilizes the driver controller 620 to send a command for making a prediction using the compiled neural network model already loaded in the memory space of the application 610 (e.g., as shown in this example as a predict command 630 using a device driver client). In this regard, the driver controller 620 sends the predict command 630 to the neural processor driver 670, which in turn sends the command to the neural processor firmware 680 for executing. The results of executing the predict command 630 are returned by the neural processor driver 670 to the application 610.

Alternatively, the application 610 can invoke a command, such as a prediction, using the loaded neural network model through communication with the neural processor daemon 640. In this example, the neural processor daemon 640 sends the command (e.g., using a device driver client invoked by the driver controller 642) to the neural processor driver 670, which then communicates with the neural processor firmware 680 that eventually runs the command on the neural processor. The results of the command are sent back to the neural processor daemon 640 from the neural processor driver 670. The neural processor daemon 640 then sends the results of the command to the application 610.

In yet another example, the neural processor daemon 640 can receive a notification that the application has been deleted or uninstalled on the electronic device (e.g., the electronic device 115). In response, the neural processor daemon 640 can remove all cached models stored in the model cache 660 that were utilized by the now uninstalled application 610.

In some implementations, a given electronic device may provide priority queues implemented in hardware. Each respective priority queue may be associated with a particular priority level, and an operation is assigned the associated priority level by virtue of the operation being included in the particular priority queue. In this manner, the electronic device can execute operations in order based on an assigned priority. In an example, these priority queues may be included as part of a system-on-chip (e.g., the SoC 250) enabling the electronic device to assign different priorities to operations for execution by a particular processor (e.g., CPU, GPU, or neural processor). In an implementation, a given processor may also provide hardware priority queues for assigning priorities to different operations.

Figure 7:
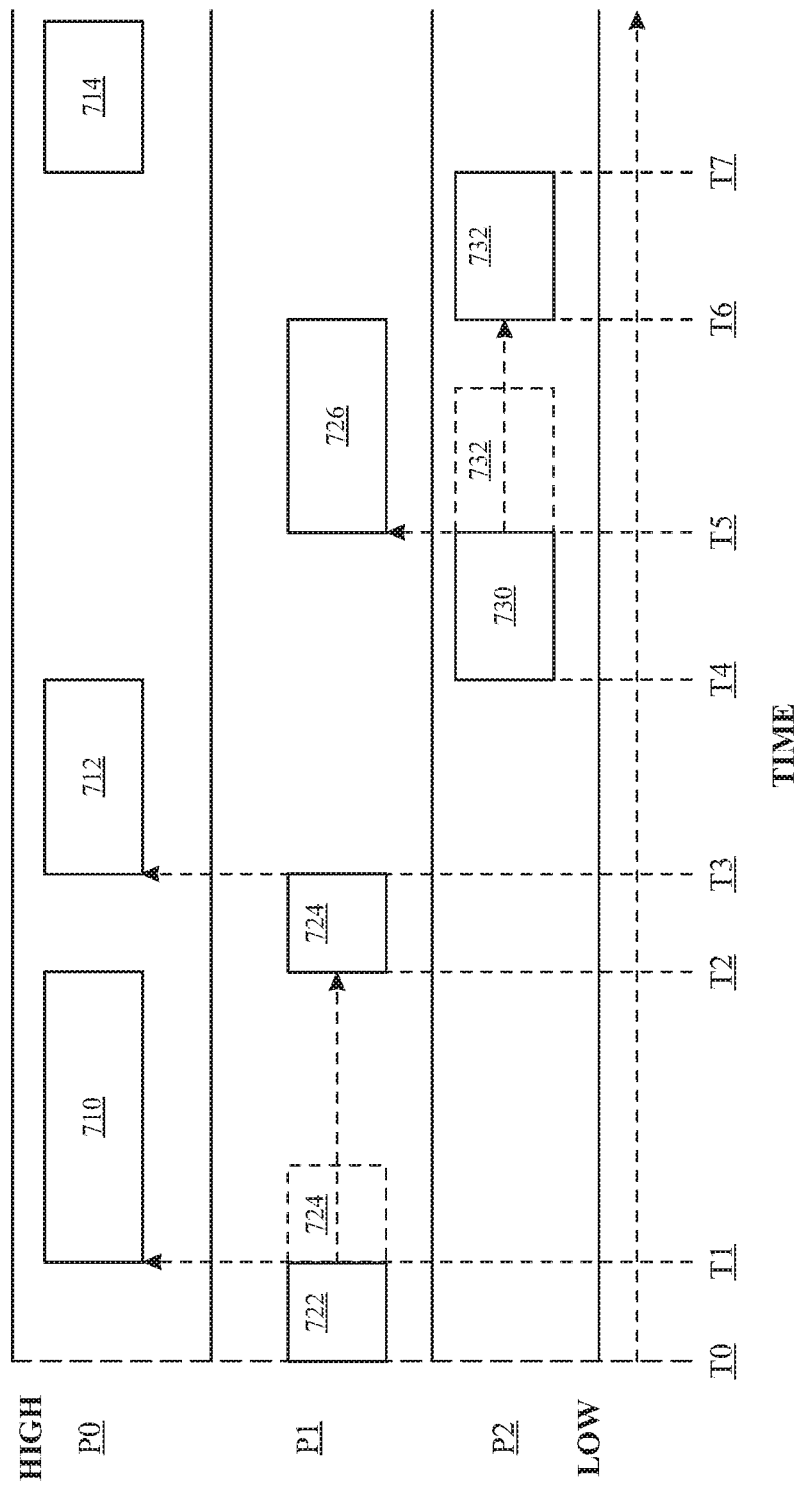
FIG. 7 conceptually illustrates an example timing chart of operations of various neural network models executing on a set of priority queues provided by a given electronic device in accordance with one or more implementations.

FIG. 7 conceptually illustrates an example timing chart of operations of various neural network models executing on a set of priority queues provided by a given electronic device (e.g., the electronic device 115) in accordance with one or more implementations. In the example of FIG. 7, three different priority queues are illustrated for purposes of explanation; however, it is appreciated that more or fewer priority queues may be supported by a given electronic device. Each priority queue may be associated with an assigned priority level where an operation in a priority queue with a higher priority level is executed before another operation in a different priority queue with a lower priority level.

In some implementations, a compiler that supports compilation of neural network source code (e.g., the neural network compiler 215 or the compiler 652) can introduce, during compiling neural network source code, preemption of operations by inserting context switch points within the source code. During execution of neural network models compiled in this manner, priority queues (e.g., available on hardware of a given electronic device such as the electronic device 115) can be utilized to support, based on the inserted context switch points, switching from executing, by a given processor, an operation from a lower priority neural network model to an operation of a higher priority neural network model. In an example, the compiler may insert a context switch point at a position in the code based on a parameter that indicates a maximum period of latency in which an operation can wait before continuing to execute. The processor, when executing the operation and determining the inserted context switch point has been reached, can switch to a different operation from another neural network model included in a higher priority queue.

As illustrated, three priority queues P0, P1, and P2 are included in descending priority from a highest priority (priority queue P0), to a middle priority (priority queue P1), and subsequently to a lowest priority (priority queue P2). In this example, at a time T0, the priority queue P1 includes an operation 722 that is processed by a processor of the electronic device, such as a neural processor. At a time T1, the processor encounters a context switch point while performing the operation 722 and performs a context switch to execute an operation 710 in the priority queue P0 which has a higher priority for execution. The operation 710 is then executed by the processor until completion in this example. At a time T2, the operation is completed and the processor executes an operation 724 in the priority queue P1, which corresponds to a resumption of the operation 722 that was delayed to switch execution over to the operation 710 in the P0 priority queue.

As further illustrated, at a time T3, the operation 724 has completed execution, and the processor executes an operation 712 in the priority P0 queue. At a time T4, the processor executes an operation 730 in the priority queue P2, which has the lowest priority for execution in this example. At a time T5, the processor reaches a context switch point while executing the operation 730, and switches to execute an operation 726 in the priority queue P1, delaying processing of any operation in the priority queue P2. At a time T6, the processor completes execution of the operation 726 and subsequently executes an operation 732 in the priority queue P2 until completion. At a time T7, the processor executes an operation 714 in the priority queue P0.

Figure 8:
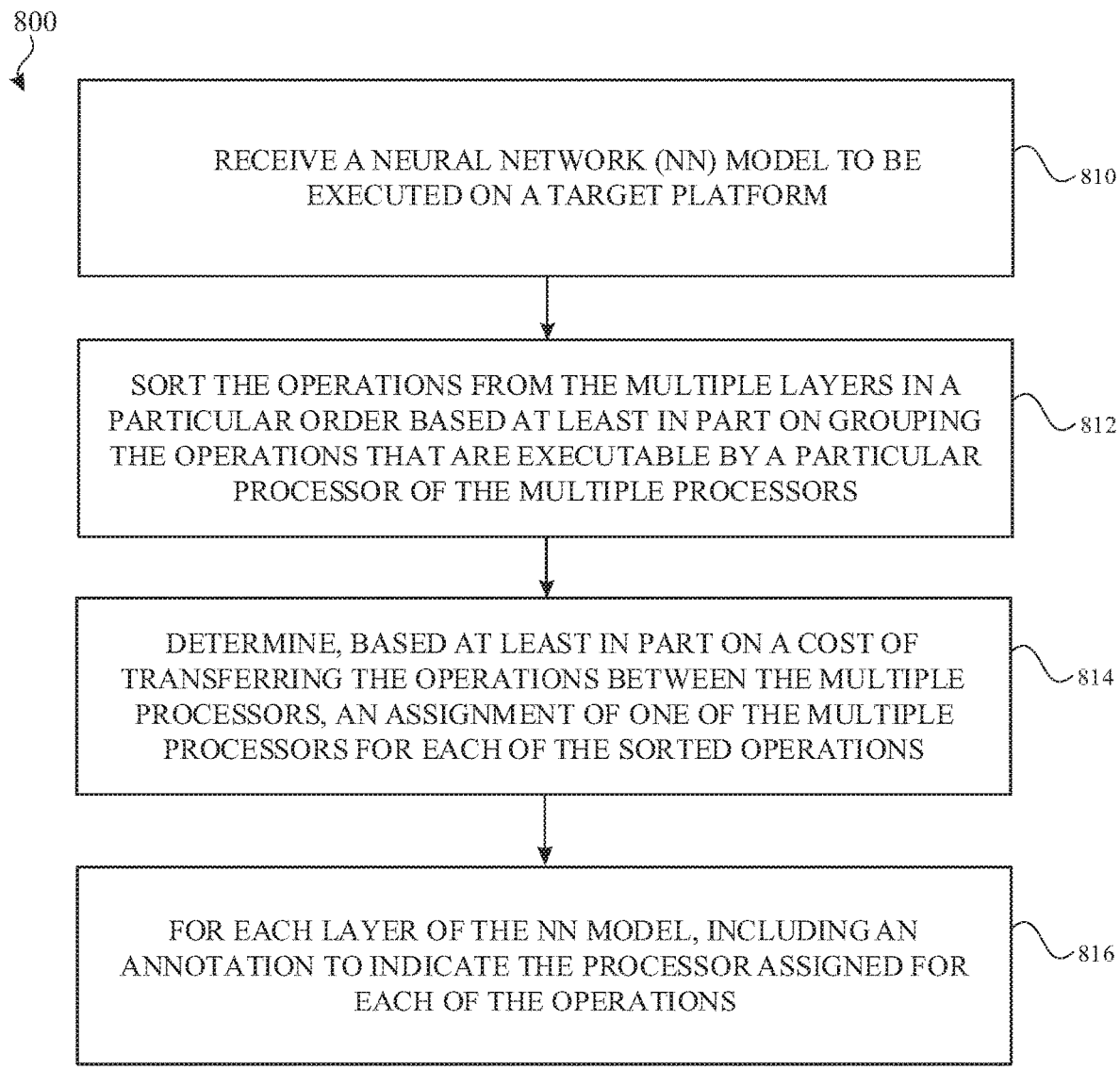
FIG. 8 illustrates a flow diagram of an example process for annotating a neural network model in accordance with one or more implementations.

FIG. 8 illustrates a flow diagram of an example process 800 for annotating a neural network model in accordance with one or more implementations. For explanatory purposes, the process 800 is primarily described herein with reference to components of the software architecture of FIG. 2, which may be executed by one or more processors of the electronic device 110 of FIG. 1. However, the process 800 is not limited to the electronic device 110, and one or more blocks (or operations) of the process 800 may be performed by one or more other components of other suitable devices, such as by the electronic device 115 (e.g., the neural processor compiler service 650). Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

The neural network task allocator 205 receives a neural network (NN) model to be executed on a target platform (810). In an example, the NN model includes multiple layers that include operations, and at least some of the operations are executable on multiple processors of the target platform. The target platform, in an example, may be a different electronic device, such as the electronic device 110.

The operation ordering controller 220 sorts the operations from the multiple layers in a particular order based at least in part on grouping the operations that are executable by a particular processor of the multiple processors (812). For example, operations that are executable by the neural processor 252 may be grouped together, operations that are executable by the CPU 254 may be grouped together and/or operations that are executable by the GPU 255 may be grouped together. As previously discussed in FIG. 3, sorting can be performed to minimize tensor lifetime and/or improve cache usage, or to minimize transfer costs from one processor to another processor.

The neural network annotator 210 determines, based at least in part on a cost of transferring the operations between the multiple processors, an assignment of one of the multiple processors for each of the sorted operations of each of the layers in a manner that minimizes a total cost of executing the operations (814). In an implementation, neural network annotator 210 generates a graph with operations sorted by an order of execution based on the sorted operations from the multiple layers. The neural network annotator 210 determines a path through nodes of the graph with an overall smallest cost to execute the operations from the multiple layers of the NN. Further, the neural network annotator 210 determines the assignment of one of the multiple processors for each of the sorted operations of each of the layers based at least in part on the determined path through the nodes of the graph.

For each layer of the NN model, the neural network annotator 210 includes an annotation to indicate the processor assigned for each of the operations (816). The NN model may be compiled with these annotations, and the target platform, while executing the compiled NN model, may perform the operations of the layers of the NN model in accordance with the annotations.

Figure 9:
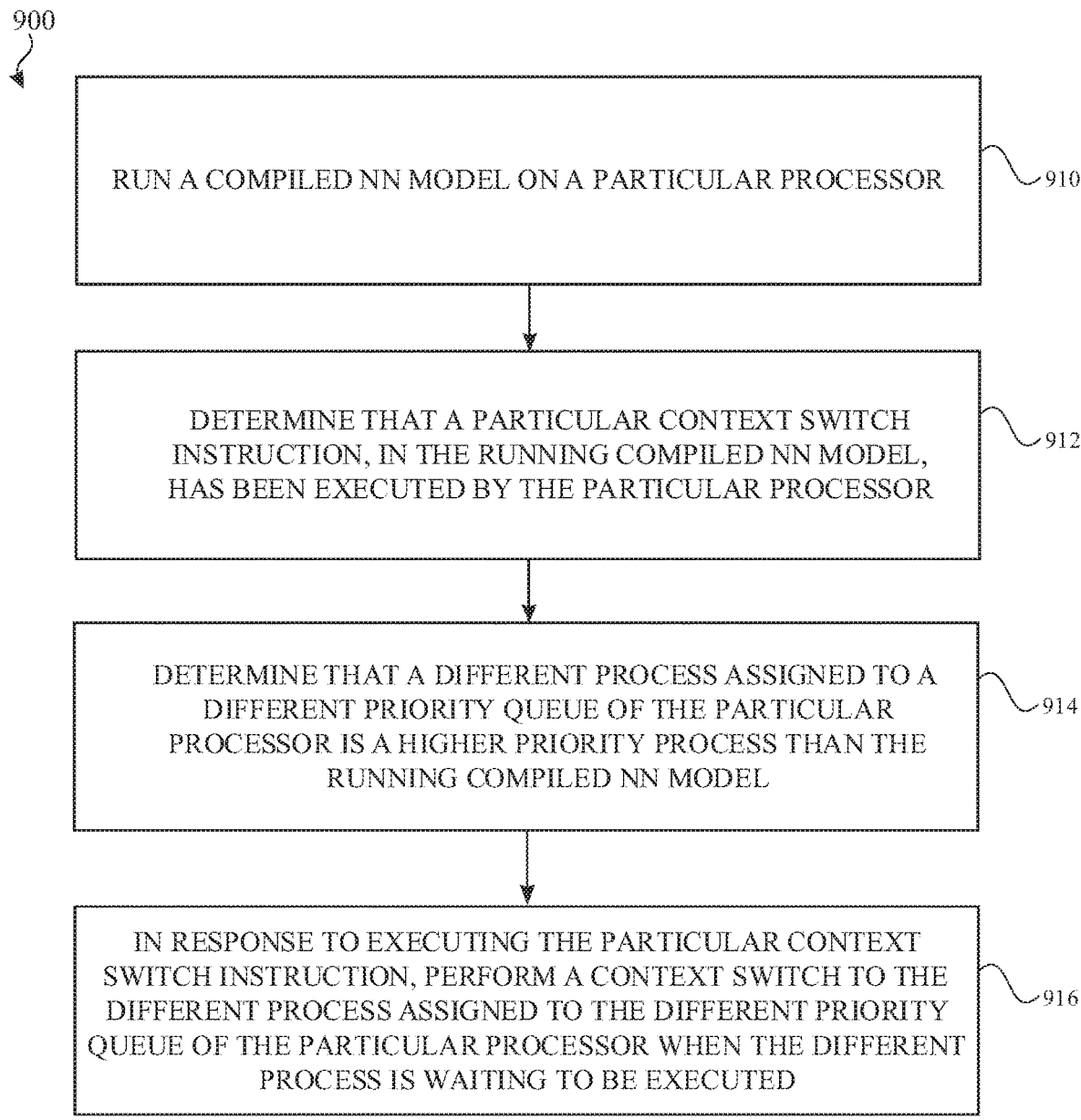
FIG. 9 illustrates an example process for preemption of operations based on priority using priority queues provided by hardware in accordance with one or more implementations.

FIG. 9 illustrates an example process 900 for preemption of operations based on priority using priority queues provided by hardware (e.g., a processor such as the neural processor 252 or the SoC 250) in accordance with one or more implementations. For explanatory purposes, the process 900 is primarily described herein with reference to components of the electronic device shown in FIG. 2, which may be executed by one or more processors of the electronic device 115 of FIG. 1. However, the process 900 is not limited to the electronic device 115, and one or more blocks (or operations) of the process 900 may be performed by one or more other components of other suitable devices. Further for explanatory purposes, the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

The electronic device 115 runs at least a portion of a compiled neural network (NN) model on a particular processor (e.g., the neural processor 252, the CPU 254, or the GPU 255). In an implementation, the particular processor includes multiple priority queues for executing different processes. The compiled NN model is assigned to a particular priority queue from the multiple priority queues where the compiled NN model includes one or more context switch instructions that have been inserted into the NN model (e.g., during compilation by the compiler) (910).

The particular processor of the electronic device 115 determines that a particular context switch instruction, in the running compiled NN model, has been executed (912). The particular processor of the electronic device 115 determines that a different process assigned to a different priority queue of the particular processor is a higher priority process than the running compiled NN model (914). For example, the different process may be operations of another complied NN model that are running on the particular processor.

In response to executing the particular context switch instruction, the particular processor performs a context switch to the different process assigned to the different priority queue of the particular processor when the different process is waiting to be executed (916).

Figure 10:
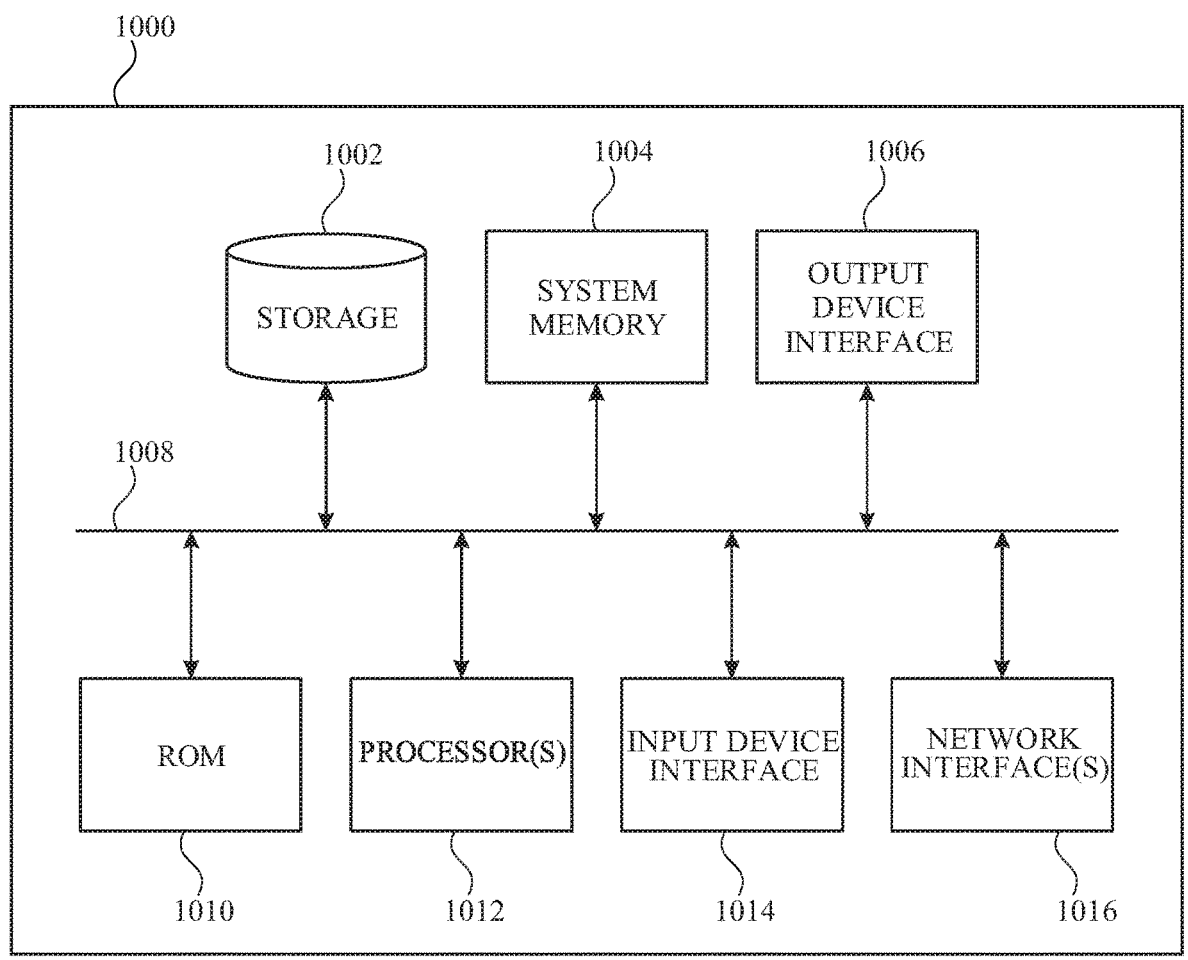
FIG. 10 illustrates an electronic system with which one or more implementations of the subject technology may be implemented.

FIG. 10 illustrates an electronic system 1000 with which one or more implementations of the subject technology may be implemented. The electronic system 1000 can be, and/or can be a part of, the electronic device 110, the electronic device 115, and/or the server 120 shown in FIG. 1. The electronic system 1000 may include various types of computer readable media and interfaces for various other types of computer readable media. The electronic system 1000 includes a bus 1008, one or more processing unit(s) 1012, a system memory 1004 (and/or buffer), a ROM 1010, a permanent storage device 1002, an input device interface 1014, an output device interface 1006, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1012 may need at runtime. In one or more implementations, the processes of the subject disclosure are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input and output device interfaces 1014 and 1006. The input device interface 1014 enables a user to communicate information and select commands to the electronic system 1000. Input devices that may be used with the input device interface 1014 may include, for example, alphanumeric keyboards and pointing devices (also called "cursor control devices"). The output device interface 1006 may enable, for example, the display of images generated by electronic system 1000. Output devices that may be used with the output device interface 1006 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the electronic system 1000 to one or more networks and/or to one or more network nodes, such as the electronic device 115 shown in FIG. 1, through the one or more network interface(s) 1016. In this manner, the electronic system 1000 can be a part of a network of computers (such as a LAN, a wide area network ("WAN"), or an Intranet, or a network of networks, such as the Internet. Any or all components of the electronic system 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   receiving a neural network (NN) model to be executed on a target platform, the NN model including multiple layers that include operations, at least some of the operations being executable on multiple processors of the target platform, the multiple processors comprising at least a CPU, a GPU, and a neural processor, wherein the CPU, the GPU, and the neural processor each have different computational specifications or capabilities;
   sorting the operations from the multiple layers in a particular order based at least in part on grouping the operations that are executable by a particular processor of the multiple processors;
   determining, based at least in part on a cost of transferring the operations between the multiple processors and a cost of performing the operations at the respective processors, an assignment of one of the multiple processors for each of the sorted operations of each of the layers in a manner that minimizes a total cost of executing the operations; and
   for each layer of the NN model, including an annotation to indicate the processor assigned for each of the operations.

2. The method of claim 1, wherein determining, based at least in part on the cost of transferring the operations between the multiple processors, the assignment of one of the multiple processors for each of the sorted operations of each of the layers further comprises:
   generating a graph with operations sorted by an order of execution based on the sorted operations from the multiple layers;
   determining a path through nodes of the graph with an overall smallest cost to execute the operations from the multiple layers of the NN; and
   determining the assignment of one of the multiple processors for each of the sorted operations of each of the layers based at least in part on the determined path through the nodes of the graph.

3. The method of claim 2, wherein each node in the graph represents a cost of an operation, from a particular layer, performed on a respective processor from the multiple processors of the target platform on which the operation is executable, and
   each edge in the graph represents a cost of transferring the operation from a first processor at a first layer to a second processor at a second layer of the NN.

4. The method of claim 1, wherein the cost of transferring the operations comprises an amount of latency for transferring the operations between the multiple processors.

5. The method of claim 2, wherein determining the path through nodes of the graph comprises determining a shortest path based on the overall smallest cost for traversing through each node of the graph, the shortest path corresponding to performing each operation in the multiple layers of the NN model.

6. The method of claim 1, wherein the neural processor is specifically configured to perform operations related to neural network models.

7. The method of claim 6, wherein the neural processor utilizes a lower amount of power when performing the operations when compared to the CPU or the GPU performing the operations.

8. The method of claim 1, wherein the target platform comprises a mobile electronic device, and the mobile electronic device executes the NN model based at least in part on the annotation to indicate the processor assigned for each of the operations.

9. A system comprising;
   a processor;
   a memory device containing instructions, which when executed by the processor cause the processor to:
      receive a neural network (NN) model to be executed on a target platform, the NN model including multiple layers that include operations, at least some of the operations being executable on multiple processors of the target platform, the multiple processors comprising at least a CPU, a GPU, and a neural processor, wherein the CPU, the GPU, and the neural processor each have different computational specifications or capabilities;
      sort the operations from the multiple layers in a particular order based at least in part on grouping the operations that are executable by a particular processor of the multiple processors;
      determine, based at least in part on a cost of transferring the operations between the multiple processors and a cost of performing the operations at the respective processors, an assignment of one of the multiple processors for each of the sorted operations of each of the layers in a manner that minimizes a total cost of executing the operations; and
      for each layer of the NN model, include an annotation to indicate the processor assigned for each of the operations.

10. The system of claim 9, wherein to determine, based at least in part on the cost of transferring the operations between the multiple processors, the assignment of one of the multiple processors for each of the sorted operations of each of the layers further causes the processor to:
  generate a graph with operations sorted by an order of execution based on the sorted operations from the multiple layers;
  determine a path through nodes of the graph with an overall smallest cost to execute the operations from the multiple layers of the NN; and
  determine the assignment of one of the multiple processors for each of the sorted operations of each of the layers based at least in part on the determined path through the nodes of the graph.

11. The system of claim 10, wherein each node in the graph represents a cost of an operation, from a particular layer, performed on a respective processor from the multiple processors of the target platform on which the operation is executable, and
  each edge in the graph represents a cost of transferring the operation from a first processor at a first layer to a second processor at a second layer of the NN.

12. The system of claim 10, wherein to determine the path through nodes of the graph with the overall smallest cost to execute the operations further causes the processor to:
  determine an amount of latency for transferring the operation performed on the respective processor to another processor.

13. The system of claim 10, wherein to determine the path through nodes of the graph comprises determining a shortest path based on the overall smallest cost for traversing through each node of the graph, the shortest path corresponding to performing each operation in the multiple layers of the NN model.

14. The system of claim 9, wherein the neural processor is configured to perform operations related to neural network models.

15. The system of claim 14, wherein the neural processor utilizes a lower amount of power when performing the operations when compared to the CPU or the GPU performing the operations.

16. The system of claim 9, wherein the target platform comprises a mobile electronic device, and the mobile electronic device executes the NN model based at least in part on the annotation to indicate the processor assigned for each of the operations.

17. A non-transitory computer-readable medium comprising instructions, which when executed by a computing device, cause the computing device to perform operations comprising:
  receiving a neural network (NN) model to be executed on a target platform, the NN model including multiple layers that include operations, at least some of the operations being executable on multiple processors of the target platform, the multiple processors comprising at least a CPU, a GPU, and a neural processor, wherein the CPU, the GPU, and the neural processor each have different computational specifications or capabilities;
  sorting the operations from the multiple layers in a particular order based at least in part on grouping the operations that are executable by a particular processor of the multiple processors;
  determining, based at least in part on a cost of transferring the operations between the multiple processors and a cost of performing the operations at the respective processors, an assignment of one of the multiple processors for each of the sorted operations of each of the layers in a manner that minimizes a total cost of executing the operations; and
  for each layer of the NN model, including an annotation to indicate the processor assigned for each of the operations.

18. The non-transitory computer-readable medium of claim 17, wherein determining, based at least in part on the cost of transferring the operations between the multiple processors, the assignment of one of the multiple processors for each of the sorted operations of each of the layers further causes the computing device to perform further operations comprising:
  generating a graph with operations sorted by an order of execution based on the sorted operations from the multiple layers;
  determining a path through nodes of the graph with an overall smallest cost to execute the operations from the multiple layers of the NN; and
  determining the assignment of one of the multiple processors for each of the sorted operations of each of the layers based at least in part on the determined path through the nodes of the graph.

19. The non-transitory computer-readable medium of claim 17, wherein the neural processor is specifically configured to perform operations related to neural network models.

20. The non-transitory computer-readable medium of claim 19, wherein the neural processor utilizes a lower amount of power when performing the operations when compared to the CPU or the GPU performing the operations.

* * * * *